United States Patent

[11] 3,626,332

[72] Inventor Ronald P. Barbatoe
Glendale, Calif.

[21] Appl. No. 31,180
[22] Filed Apr. 23, 1970
[45] Patented Dec. 7, 1971
[73] Assignee The United States of America as represented by the Secretary of the Navy

[54] QUADRATURE HYBRID COUPLER NETWORK COMPRISING THREE IDENTICAL TANDEM FIFTEEN CASCADED SECTION COUPLERS
1 Claim, 2 Drawing Figs.

[52] U.S. Cl. .......... 333/10, 333/84 M
[51] Int. Cl. .......... H01p 5/14
[50] Field of Search .......... 333/10, 84 M

[56] References Cited

UNITED STATES PATENTS 3,164,790 1/1965 Oh .......... 333/10

OTHER REFERENCES

Shelton et al., Synthesis and Design of Wide-Band Equal-Ripple TEM Directional Couplers and Fixed Phase Shifters MTT-14 No. 10, Oct. 1966, TK7800I23 Micronotes, Microwave Assoc., Inc. Vol. 5, No. 7, May 1968 333-10

*Primary Examiner*—Herman Karl Saalbach
*Assistant Examiner*—Paul L. Gensler
*Attorneys*—R. S. Sciascia, G. J. Rubens, J. W. McLaren and T. M. Phillips ABSTRACT: A quadrature hybrid coupler comprising three dielectric layers sandwiched between two backup plates. Positioned on both sides of the center dielectric layer are copper strips forming three identical tandem, fifteen cascaded section couplers. Each of the tandem couplers provide a perfect match to the next section.

PATENTED DEC 7 1971

3,626,332

RONALD P. BARBATOE
INVENTOR.

BY [signature]
[signature]
ATTORNEYS

QUADRATURE HYBRID COUPLER NETWORK COMPRISING THREE IDENTICAL TANDEM FIFTEEN CASCADED SECTION COUPLERS

The invention herein described may be manufactured and used by or for The Government of the United States of America for governmental purposes without the payment of any royalties thereon or therefor.

BACKGROUND OF THE INVENTION

1. Field of the Invention

The purpose of the present invention is to provide an improved quadrature hybrid. More particularly, it is to provide an improved stripline quadrature hybrid for processing received microwave signals over the frequency bandwidth of 0.7 to 11.0 GHz.

2. Description of the Prior Art

Early prior art stripline quadrature hybrids comprised a single copper strip coupling section sandwiched between dielectric substrates such as polyolefin or Teflon. This type of device was also constructed, in some instances, by placing the inner conductor of two coaxial cables in close proximity to each other and surrounding them with a common outer conductor.

Because these prior art devices were composed of only a single section their amplitude bandwidth was relatively narrow, being anywhere from 50 percent to a maximum of one octave. In addition, a further disadvantage resulted due to the transition from the feed lines, a region of no material coupling to a region of tight material coupling. Poor insulation and a high voltage standing wave ratio (VSWR) resulted in many instances.

The next generation of stripline quadrature hybrids were broadband multisection, multicoupler devices. Typical of this type of hybrid was one composed of 3 tandem (parallel) connected, multisection couplers. The first coupler had 13 cascaded (series) sections; the second coupler had three cascaded sections; and the third coupler had one section.

Although this device did provide a broadband amplitude response, the transition ratio problem of the single section device remained. This was because the end section (13) of the first cascaded coupler, had a low impedance coupling value while the one section of the third cascaded coupler had a much higher impedance coupling value. The result was a poor match between the tandem couplers resulting in a high VSWR, poor isolation, and a distorted amplitude response.

The present device overcomes this tandem mismatch problem by providing a quadrature hybrid comprising three identical couplers each having 15 cascaded coupling sections arranged such that the transition ratio or factor i.e., the ratio of that energy transmitted to that energy reflected, from one cascaded section to the next does not exceed 2:1.

SUMMARY OF THE INVENTION

The quadrature hybrid of the present invention comprises three dielectric layers sandwiched between 2 backup plates. The circuit, comprising 3, 15 section symmetrical couplers in tandem, is etched on both sides of the center layer with one-half of each symmetrical coupler positioned on one side of said center layer and the other half positioned on the opposite side of the center layer such that the two halves compliment each other in forming the quadrature hybrid.

The backup plates which can be aluminum can also serve as ground planes.

BRIEF DESCRIPTION OF THE DRAWING

Many of the attendant advantages of this invention will become readily appreciated as the same becomes better understood by reference to the following detailed description when considered in connection with the accompanying drawings wherein.

DESCRIPTION OF THE PREFERRED EMBODIMENT

Figure 1:
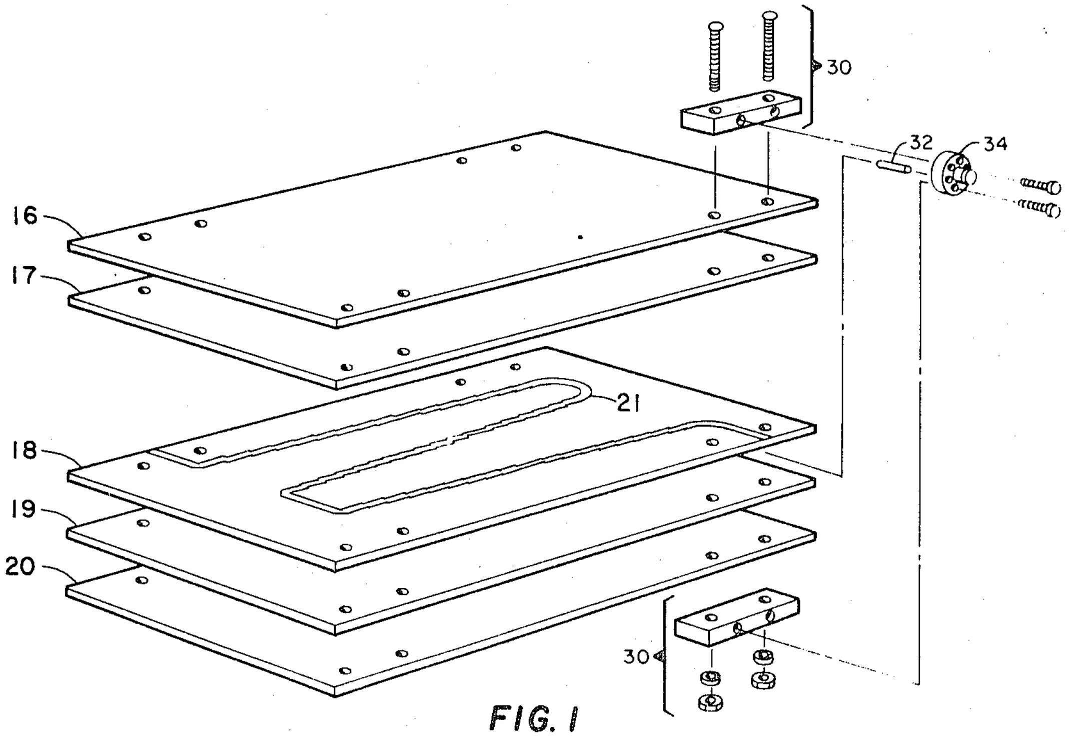
FIG. 1 is an exploded view showing the quadrature hybrid of the present invention.

Referring to FIG. 1, the stripline quadrature hybrid of the present invention comprises three layers of dielectric material, a first layer 17, a a second center layer 18, and a third layer 19, sandwiched between a pair of backup plates 16, 20.

Figure 2:
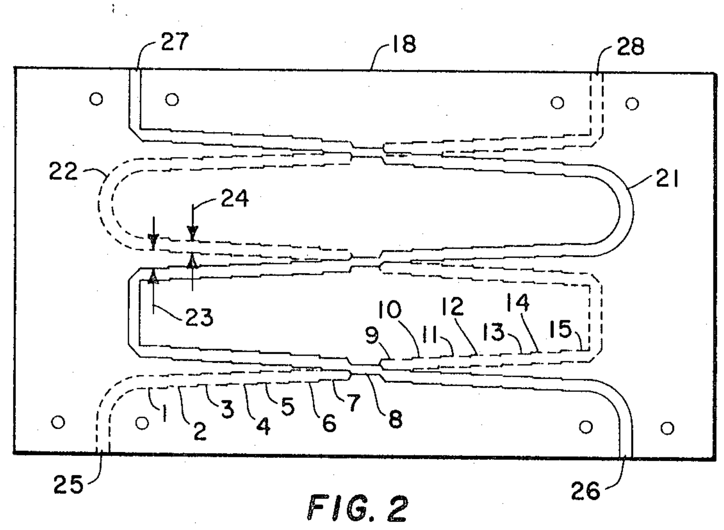
FIG. 2 is a plan view showing the stripline circuitry positioned on the center dielectric layer.

Stripline circuitry, consisting of three identical flat stripline couplers connected in tandem, is positioned between said first dielectric layer 17 and said third dielectric layer 19. Each identical coupler has fifteen cascaded coupling sections 1–15 (FIG. 2) and comprises a pair of complimentary halves. A first half 21 of the stripline circuitry, comprising one half of each of the tandem connected couplers, is positioned between said first dielectric layer 17 and said second dielectric layer 18. A second half 22 of the stripline circuitry comprising the other half of each of the tandem connected couplers is positioned between said second dielectric layer 18 and said third dielectric layer 19.

The impedance value of each of the 15 sections is fixed by the dielectric constant of the dielectric material, spacing between stripline strips (copper) and spacing between ground planes. The variation in coupling from section to section is achieved by offsetting the strip overlap 23 and varying the stripline width 24. The length of each section is determined by the frequency band over which the device is to operate. Each section must be a quarter-wavelength at the chosen frequency. For a −3 db quadrature hybrid the length of each section is 0.270 inches. Table I lists the fabrication parameters for the quadrature hybrid of the present embodiment. These dimensional values were used to produce rubylith artwork which was in turn used to produce a photographic mask. This mask was then employed to etch the center dielectric section 18.

The etched center section 18 and the accompanying dielectric bound ground planes 17 and 19 are held securely in place by means of backup plates 16 and 12 with mounting assembly 30. Center conductor 32 of port connector 34 is soldered or otherwise attached to stripline circuit 21. Similar mounting assemblies would be provided for the other three corners. Port connectors would also be provided for ports 25, 26, 27 and 28.

In operation, an input signal applied at either port 25 or 26 reappears as two equal −3 db. output signals at ports 27 and 28 having a phase difference of 90°. The input and output VSWR remains less than 1.5:1 with an isolation of greater than 20 db.

TABLE I

Fabrication Parameters For −3 db. Quadrature Hybrid

| | |
|---|---|
| Dielectric Material | = Polyolefin |
| Dielectric Constant | = 2.32 |
| Ground Plane Spacing | = 0.156 inches |
| Shim Spacing | = 0.031 inches |
| Length of Each Section | = 0.270 inches |

| Section | Stripwidth | Gap Width |
|---|---|---|
| 1 | 0.118 | +0.133 |
| 2 | 0.118 | +0.104 |
| 3 | 0.118 | +0.080 |
| 4 | 0.117 | +0.057 |
| 5 | 0.115 | +0.038 |
| 6 | 0.112 | +0.018 |
| 7 | 0.104 | −0.005 (overlap) |
| 8 | 0.088 | −0.088 (overlap) |
| 9 | 0.104 | −0.005 (overlap) |
| 10 | 0.112 | +0.018 |
| 11 | 0.115 | +0.038 |
| 12 | 0.117 | +0.057 |
| 13 | 0.118 | +0.080 |
| 14 | 0.118 | +0.104 |
| 15 | 0.118 | +0.133 |

What is claimed is:

1. In a 0.7 to 11.0 GHz quadrature hybrid coupler network system comprising:

a. three dielectric layers sandwiched between two metal ground plane backup plates, b. a first set of interconnected successive conductors in the form of flat stripline occupying a first plane and positioned on one side of the center dielectric layer of said three dielectric layers, c. a second set of interconnected successive conductors in the form of flat stripline occupying a second plane and positioned on the other side of said center dielectric layer, d. said first and second sets being shaped and positioned with respect to each other as to form three identical tandem 15 cascaded section couplers with a transition ratio of less than 2:1 from one cascade section to the next, the input or isolated port of the first coupler being the input terminal of the system and the straight-through and coupled ports of the third coupler being the output terminals of the system.

* * * * *